United States Patent [19]

Cooper et al.

[11] Patent Number: 5,077,657
[45] Date of Patent: Dec. 31, 1991

[54] EMULATOR ASSIST UNIT WHICH FORMS ADDRESSES OF USER INSTRUCTION OPERANDS IN RESPONSE TO EMULATOR ASSIST UNIT COMMANDS FROM HOST PROCESSOR

[75] Inventors: Thayne C. Cooper, West Valley City; Wayne D. Bell, Bountiful; Norman J. Rasmussen, Murray, all of Utah

[73] Assignee: Unisys, Blue Bell, Pa.

[21] Appl. No.: 367,271

[22] Filed: Jun. 15, 1989

[51] Int. Cl.$^5$ .................. G06F 9/06; G06F 12/06; G06F 1/24
[52] U.S. Cl. ................. 395/500; 364/238.2; 364/238.5; 364/241; 364/247.2; 364/254.4; 364/280.2; 364/280.8; 364/281.9; 364/284.4; 364/927.96; 364/929; 364/929.4; 364/941.1; 364/957.2; 364/975.2; 364/DIG. 1; 364/DIG. 2
[58] Field of Search ... 364/200 MS File, 900 MS File

[56] References Cited

U.S. PATENT DOCUMENTS

| | | | |
|---|---|---|---|
| 3,374,466 | 3/1968 | Hanf et al. | 364/200 |
| 3,544,969 | 12/1970 | Rokoczi et al. | 364/200 |
| 3,646,522 | 2/1972 | Furman et al. | 364/200 |
| 3,997,895 | 12/1976 | Cassonnet et al. | 364/200 |
| 4,447,876 | 5/1984 | Moore | 364/200 |
| 4,514,803 | 4/1985 | Agnew et al. | 364/200 |
| 4,527,234 | 7/1985 | Bellay | 364/200 |
| 4,587,612 | 5/1986 | Fisk et al. | 364/200 |
| 4,591,982 | 5/1986 | Buonomo et al. | 364/200 |
| 4,638,423 | 1/1987 | Ballard | 364/200 |
| 4,695,945 | 9/1987 | Irwin | 364/200 |
| 4,729,094 | 9/1988 | Zolnowsky et al. | 364/200 |
| 4,763,242 | 8/1988 | Lee et al. | 364/200 |
| 4,812,975 | 3/1989 | Adachi et al. | 364/300 |
| 4,859,995 | 8/1989 | Hansen et al. | 340/710 |
| 4,888,680 | 12/1989 | Sander et al. | 364/200 |
| 4,920,481 | 4/1990 | Binkley et al. | 364/200 |

*Primary Examiner*—Thomas C. Lee
*Assistant Examiner*—Ken S. Kim
*Attorney, Agent, or Firm*—Charles J. Fassbender; Mark T. Starr

[57] ABSTRACT

An emulator is comprised of a host processor, an emulator, assist unit, and a memory which are closely coupled together over a co-processor bus. Stored in the memory is a user program which is a sequence of instructions from a user instruction set that is to be emulated, and a control program which is a mixture of host processor instructions and emulator assist unit instructions. In operation, the host processor reads and executes the hosts instructions, and it reads and passes the emulator assist unit instructions to the emulator assist unit for execution in that unit. By this means, the host processor and the emulator assist unit share the emulation tasks; and those tasks which are most difficult for the host are performed by the emulation assist unit. As one example the emulator assist unit has registers and controls which respond to the emulator assist unit instructions by examining the fields of the next user instruction that is to be emulated and by generating memory addresses of the operands which that next user instruction operates on; while the host uses those addresses to read the operands from memory and perform operations on the operands as specified by the user instruction.

10 Claims, 5 Drawing Sheets

FIG.5A

```
IF R/M=000 THEN EA=(BX)-(SI)-DISP
IF R/M=001 THEN EA=(BX)-(DI)-DISP
IF R/M=010 THEN EA=(BP)-(SI)-DISP
IF R/M=011 THEN EA=(BP)-(DI)-DISP
IF R/M=100 THEN EA=(SI)-DISP
IF R/M=101 THEN EA=(DI)-DISP
IF R/M=110 THEN EA=(BP)-DISP
IF R/M=111 THEN EA=(BX)-DISP
```

FIG.5B

```
IF MOD=11 THEN R/M IS TREATED AS A REG FIELD
IF MOD=00 THEN DISP=0,DISP-LOW & DISP-HIGH ARE ABSENT
IF MOD=01 THEN DISP=DISP-LOW SIGN EXTENDED TO
16 BITS.DISP-HIGH IS ABSENT
IF MOD=10 THEN DISP=DISP-HIGH;DISP-LOW
```

FIG.5C

```
REG
    16 BIT(w=1)    8 BIT(w=0)
    000 AX         000 AL
    001 CX         001 CL
    010 DX         010 DL
    011 BX         011 BL
    100 SP         100 AH
    101 BP         101 CH
    110 SI         110 DH
    111 DI         111 SH
```

FIG.5D

| SEGMENT REGISTER USED | INPLICIT SEGMENT SELECTION RULE |
|---|---|
| CODE(CS) | AUTOMATIC WITH INSTRUCTION PREFETCH |
| STACK(SS) | ALL STACK PUSHES AND POPS.ANY MEMORY REFERENCE WHICH USES BP AS A BASE REGISTER. |
| DATA(DS) | ALL DATA REFERENCES EXCEPT WHEN RELATIVE TO STACK OR STRING DESTINATION |
| EXTRA(ES) | ALTERNATE DATA SEGMENT AND DESTINATION OF STRING OPERATION |

EMULATOR ASSIST UNIT WHICH FORMS ADDRESSES OF USER INSTRUCTION OPERANDS IN RESPONSE TO EMULATOR ASSIST UNIT COMMANDS FROM HOST PROCESSOR

BACKGROUND OF THE INVENTION

This invention relates to digital computer emulators; and more particularly, it relates to the architecture and operating speed of such emulators.

Currently, there are many different manufacturers of digital computers; and, each manufacturer makes its computers such that they execute their own uniquely formatted set of instructions. For example, a Motorola 68030 microprocessor is designed to execute a 68030 set of instructions, whereas an Intel 80×86 microprocessor is designed to execute an 80×86 set of instructions ("X" is 2 or 3). Since each such set of instructions has its own unique format, user programs which are written with 80×86 instructions cannot run directly on the Motorola 68030 microprocessor; and vice versa.

On the other hand, user programs which are written for the computer of one manufacturer (the target computer) often perform functions which the users of computers of other manufacturers (the host computer) would also like to perform. But to rewrite a long and complicated program from one computer's instruction set to another computer's instruction set can be very time-consuming and expensive. Consequently, computer emulators have been developed.

In one common form, an emulator consists entirely of a software program called an emulator program which consists entirely of host computer instructions. This emulator program sequentially examines all the fields of the target machine instruction that is being emulated, forms the addresses of the operands which those fields specify, retrieves the operands, performs an operation on those operands, and stores the result.

However, to perform all of the above tasks for just one instruction of the target machine takes many host instructions in the emulator program. For example, to perform a single target machine instruction can easily take fifty to one hundred fifty instructions in the emulator program. Thus, the execution time of such an emulator is inherently slow.

Accordingly, a primary object of the invention is to provide a novel and economical architecture for an emulator in which emulation speed is substantially increased.

BRIEF SUMMARY OF THE INVENTION

In accordance with the present invention, an emulator is comprised of a host processor, an emulator assist unit, and a memory which are tightly coupled together over a co-processor bus. This memory contains a user program which is a sequence of instructions from a user (i.e., target) instruction set that is to be emulated, and it also contains a control program which is a mixture of host processor instructions and emulator assist unit instructions. In operation, the host processor reads and executes the host instructions, and it reads and passes the emulator assist unit instructions to the emulator assist unit for execution in that unit. By this means, the host processor and the emulator assist unit share the emulation tasks; and the emulation assist unit performs those tasks which are the most difficult for the host. As one example, the emulator assist unit has registers and controls which respond to the emulator assist unit instructions by examining the fields of the next user instruction that is to be emulated and by generating memory addresses of the operands which that next user instruction operates on; while the host uses those addresses to read the operands from memory and perform operations on the operands as specified by the user instruction.

BRIEF DESCRIPTION OF THE DRAWINGS

Various features and advantages of the invention are described herein in conjunction with the accompanying drawings wherein:

FIG. 5A-5D together illustrate additional details of how addresses of use instruction operands are formed by the FIG. 3 emulator assist unit.

DETAILED DESCRIPTION OF THE INVENTION

Figure 1:
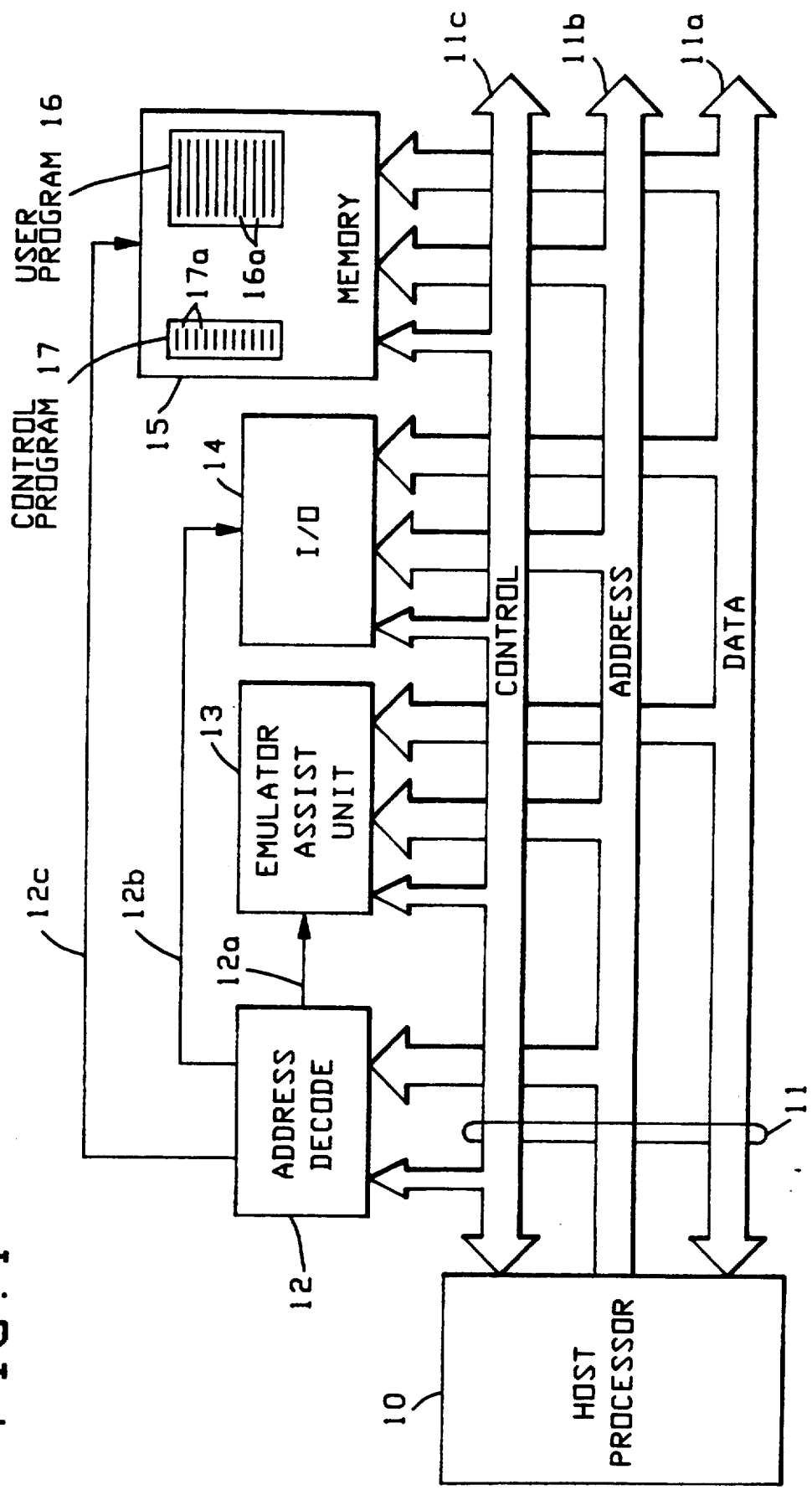
FIG. 1 illustrates a co-processor emulator which is constructed according to the invention.

Referring now to FIG. 1, a preferred embodiment of a data processing system which performs emulation in accordance with the invention will be described. This system includes a host processor 10, a bus 11, an address decoder 12, an emulator assist unit 13, an input/output device 14, and a memory 15. All of these members are interconnected as FIG. 1 illustrates.

In one preferred embodiment, the host processor 10 is a Motorola MC68030 32-bit microprocessor; and the bus 11 consists of the input/output signals for the MC68030. Those input/output signals include thirty-two data lines 11A, thirty-two address lines 11B and twenty-five control lines 11C. Background information on the MC68030 microprocessor itself is contained in the Motorola Microprocessor User's Manual, 2d Edition, number 0-13-566969-3 which is available from Motorola.

Consider now how all the members 10–15 of the FIG. 1 system operate together to perform emulation during which a user program 16 that resides in memory 15 is executed. This user program 16 consists- of a sequence of instructions 16A, each of which has an entirely different format than the instructions of the MC68030 host processor 10. In one preferred embodiment, the user instructions are Intel 80×86 microprocessor instructions. Background information on the 80×86 is contained in the Intel Microsystem Components Handbook, Vol. 1, Order No. 230843001, 1984, which is available from Intel Corporation of Santa Clara, Calif.

Figure 2A:
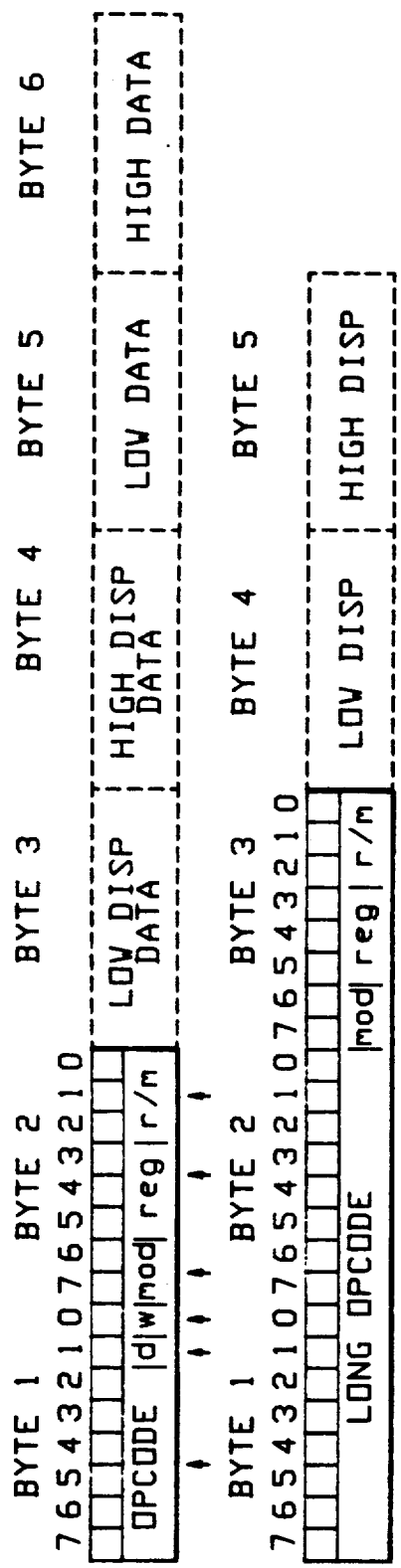
FIG. 2A illustrates a format for the user (i.e., target) instructions which the FIG. 1 system emulates.
Figure 2B:
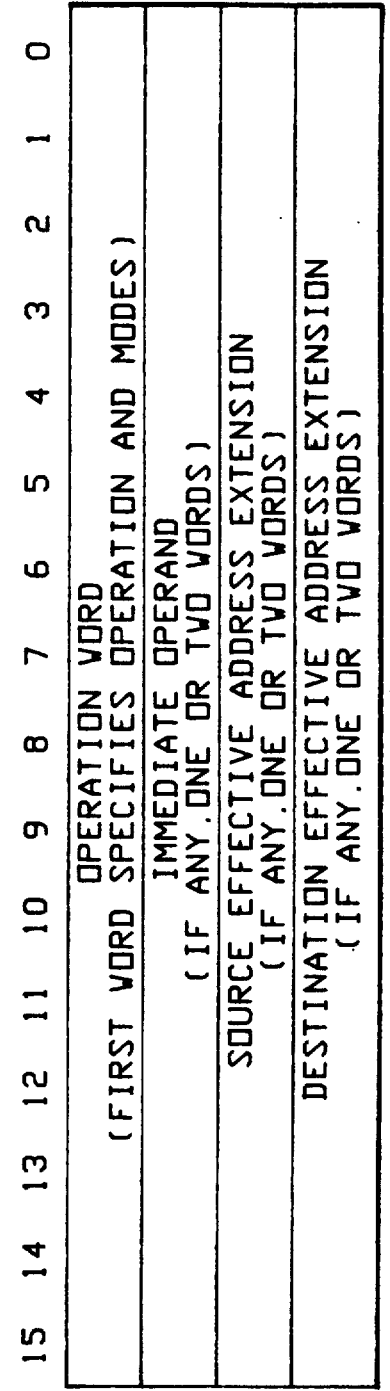
FIG. 2B illustrates a format of the instructions which the FIG. 1 host processor executes.

For comparison purposes, FIG. 2A illustrates the format of the Intel instructions, whereas FIG. 2B illustrates the format of the Motorola instructions. Inspection of FIG. 2A shows that the Intel 80×86 instructions have a 2-bit "MOD" field, a 3-bit "REG" field, and a 3-bit "R/M" field which together specify the location of one or two operands. By comparison, FIG. 2B shows that such fields don,t even exist in the Motorola instructions. Further, the Intel 80×86 instructions use the content of several registers which are called AX, BX, CX, DX, BP, SP, DI, SI, ES, CS, SS, DS, FS and GS; and these registers don't exist in the Motorola 68030 microprocessor. Also, several of the Intel 80×86 instructions cause certain condition codes to be set to indicate the instruction results, and these same condition codes are not in the 68030 microprocessor.

Due to the above differences and others between the Intel 80×86 instructions and the Motorola 68030 instructions, it is very cumbersome to emulate the Intel instructions by means of a 68030 software program. If 68030 instructions are used to examine all the different fields of the the Intel 80×86 instructions, generate the various operand addresses, fetch the operands and perform byte swapping, perform the called-for operation, and set condition codes, then the resulting overall execution time is very slow.

But in the FIG. 1 system, this speed problem is overcome by the emulator assist unit 13 which operates in conjunction with the Motorola host processor 10 and a control program 17 in memory 15. Using these system components, the tasks within each Intel 80×86 instruction are split up such that the Motorola 68030 processor performs only those tasks which it can do efficiently, and the emulator assist unit is tailored to perform the remaining tasks efficiently. How these tasks are divided is directed by the control program 17 which is a mixture of host processor instruction and emulator assist unit instructions.

Reference numeral 17A in FIG. 1 indicates individual instructions and emulator assist unit instructions. Those instructions 17A are sequentially read from memory 15 by the host processor 10. If the read instruction is a Motorola 68030 instruction, then it is executed directly by the host processor. Conversely, if the read instruction is an emulator assist unit instruction, it is passed by the host processor to the emulator assist unit 13 for execution therein.

Figure 3:
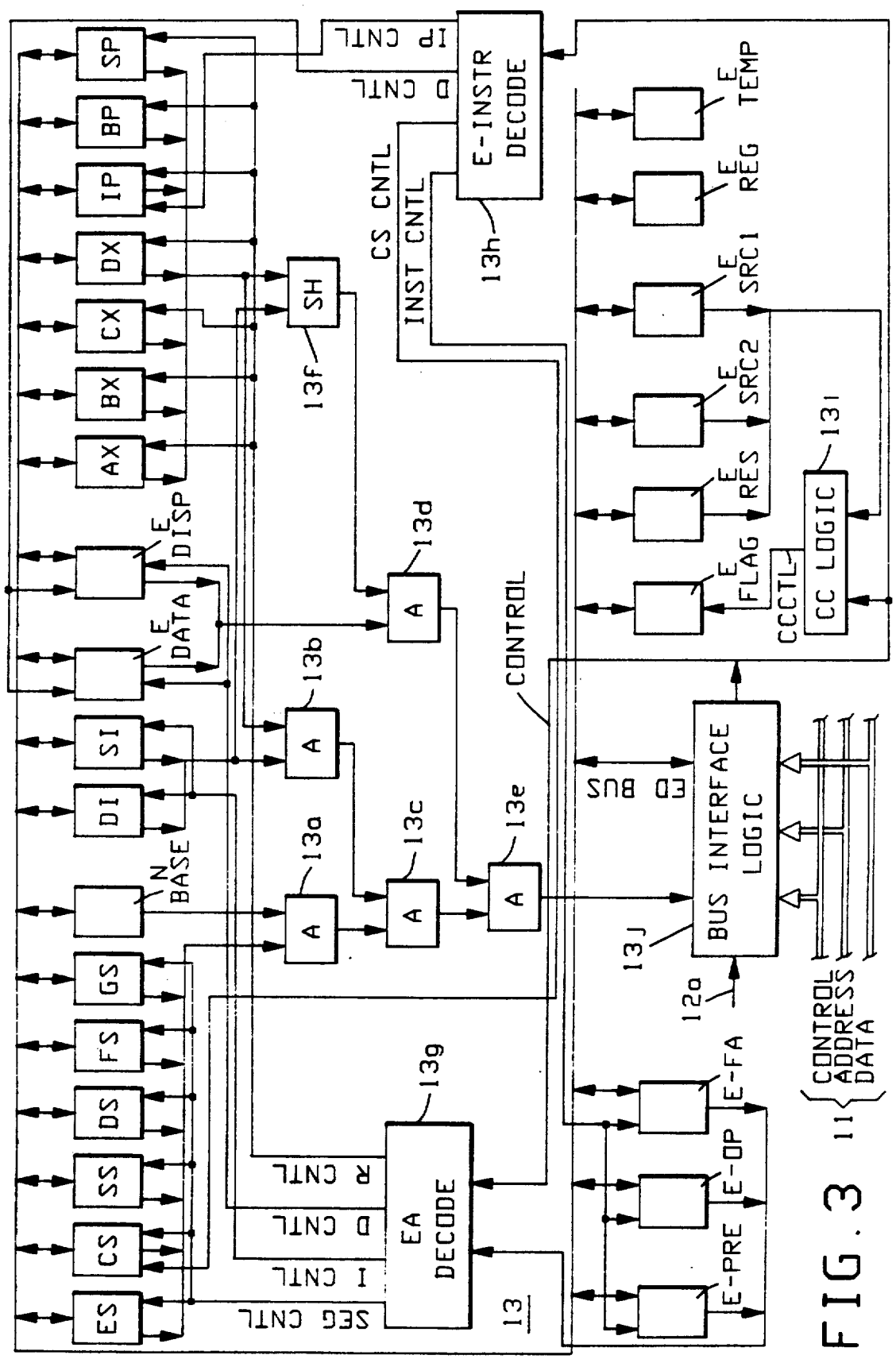
FIG. 3 illustrates the details of a preferred architecture for the emulator assist unit in the FIG. 1 system.

Turning now to FIG. 3, it shows in greater detail the structure of the emulator assist unit 13. This unit contains several registers, and their reference letters and use are as follows.

IP. This register contains the address of the current or next user instruction in memory 15 that is to be executed.

E-PRE. This register holds the prefix field, if any, the current user instruction that is being executed.

E-OP. This register holds the OP Code of the current user instruction as being executed. address and SIB byte, if any, of the current user instruction that is being executed.

E-REG. This register maintains the TTT bits, if any, of the effective address register.

E-DISP. This register maintains the displacement, if any, of the current user instruction that is being executed.

E-DATA. This register maintains the immediate data, if any, of the current user instruction that is being executed.

E-TEMP. This register is used to temporarily hold data during the execution on a user instruction.

E-MBASE. This register holds the address of the location in memory 15 where the user program begins.

E-SRC1. This register holds a first source operand for the current user instruction.

E-SRC2. This register holds a second operand for the current user instruction that is being executed.

E-RES. This register holds the result of the current user instruction that is being executed.

AX, BX, CX, and DX. These are byte-addressable registers which the Intel instructions select and use to hold data or a portion of an address which locates data.

DI, SI and BP. These registers are selected by the user instructions to be combined with other registers to form the address of an operand.

SP. This register addresses a portion of memory 15 which is the beginning of a stack for the user instructions.

ES, CS, SS, and DS. These are segment registers which are combined with the content of other registers to form the address in memory of user data and user instructions.

E-FLAG. This register holds the condition codes which are set/reset to indicate the results of an Intel 80×86 instruction. The various bits of this register indicate the following conditions.

| Bit | Condition |
|---|---|
| 0 | Overflow |
| 1 | Not Overflow |
| 2 | Below/Carry/Not Above or Equal |
| 3 | Above or Equal/Not Below/Not Carry |
| 4 | Equal/Zero |
| 5 | Not Equal/Not Zero |
| 6 | Below or Equal/Not Above |
| 7 | Above/Not Below or Equal |
| 8 | Sign |
| 9 | Not Sign |
| A | Parity/Parity Even |
| B | Not Parity/Parity Odd |
| C | Less/Not Greater or Equal |
| D | Not Less/Greater or Equal |
| E | Less or Equal/Not Greater |
| F | Not Less or Equal/Greater |

Also included in the emulator assist unit 13 are five adders 13a–13e, a shifter 13f, effective address control logic 13g, an instruction decoder 13h, and condition code logic 13i. These components 13a–13i are interconnected to the emulator assist unit register as FIG. 3 illustrates.

In operation, the control logic 13g examines the content of E-PRE, E-OP and E-EA; and based on their content and an emulator assist unit instruction, it generates control signals SEGCNTL, ICNTL, DCNTL, and RCNTL. The SEGCNTL signals pass the contents of one of the segment registers ES, CS, SS, DS, FS and GS into the adder 13a; the ICNTL signals pass the content of one of the index registers DI and SI into adder 13b; the DCNTL signals pass the content of the E-DATA and E-DISP into adder 13d; and the RCNTL signals pass the content of one of the registers AX, BX, CX, DX, IP, BP, and SP into adder 13b and shifter 13f.

All of the above selected register contents are combined by components 13a–13f to form a memory address, at the output of adder 13e, of Intel 80×86 instructions and their operands. Operand addresses are specified by the previously described 2-bit MOD field, 3-bit REG field, and 3-bit R/M field. Such addressing is completely different than the manner in which the Motorola host processor forms its operand memory addresses; and thus the emulator assist unit 13 provides more than a simple extension of the Motorola instructions. Instead, it provides a new computer architecture (i.e., the Intel 80×86 architecture) which cannot be effectively emulated by the Motorola 68030 processor.

Instruction decoder 13h receives as an input emulator assist unit instructions, and in response it generates control signals INSTCNTL, CSCNTL, DCNTL, and IPCNTL. The INSTCNTL signals load respective portions of the 80×86 instruction into the E-PRE, E-OP, and E-EA registers; and the CSCNTL signals pass the content of the CS register into adder 13a; the DCNTL signals load the displacement and data portions of an 80×86 instruction into the E-DISP and E-DATA registers; and the IPCNTL signal passes the content of the IP register into the adder 13b. In like fashion, the condition code logic examines the content of registers E-RES, E-SRC1, and E-SRC2; and, in response to an emulator assist unit instruction, it generates control signals CCCNTL which set the condition codes in the E-FLAG register. Here again, these tasks cannot be efficiently performed by the host processor.

Further included in the emulator assist 13 unit is bus interface logic 13j. It consists of various registers and controls that are needed to send and receive information on bus 11 as a co-processor. This bus interface logic 13j can have any configuration so long as it meets the MC68030 co-processor interface requirements as is given in the MC68030 User Manual which was referenced on page 4. Through this interface logic, the emulator assist unit 13 is tightly coupled to the Motorola host processor. Specifically, information is sent back and forth between the host processor 10, the emulator assist unit 13 and the memory 15 via a single instruction and without the need for any interrupt processing by the host.

Figure 4:
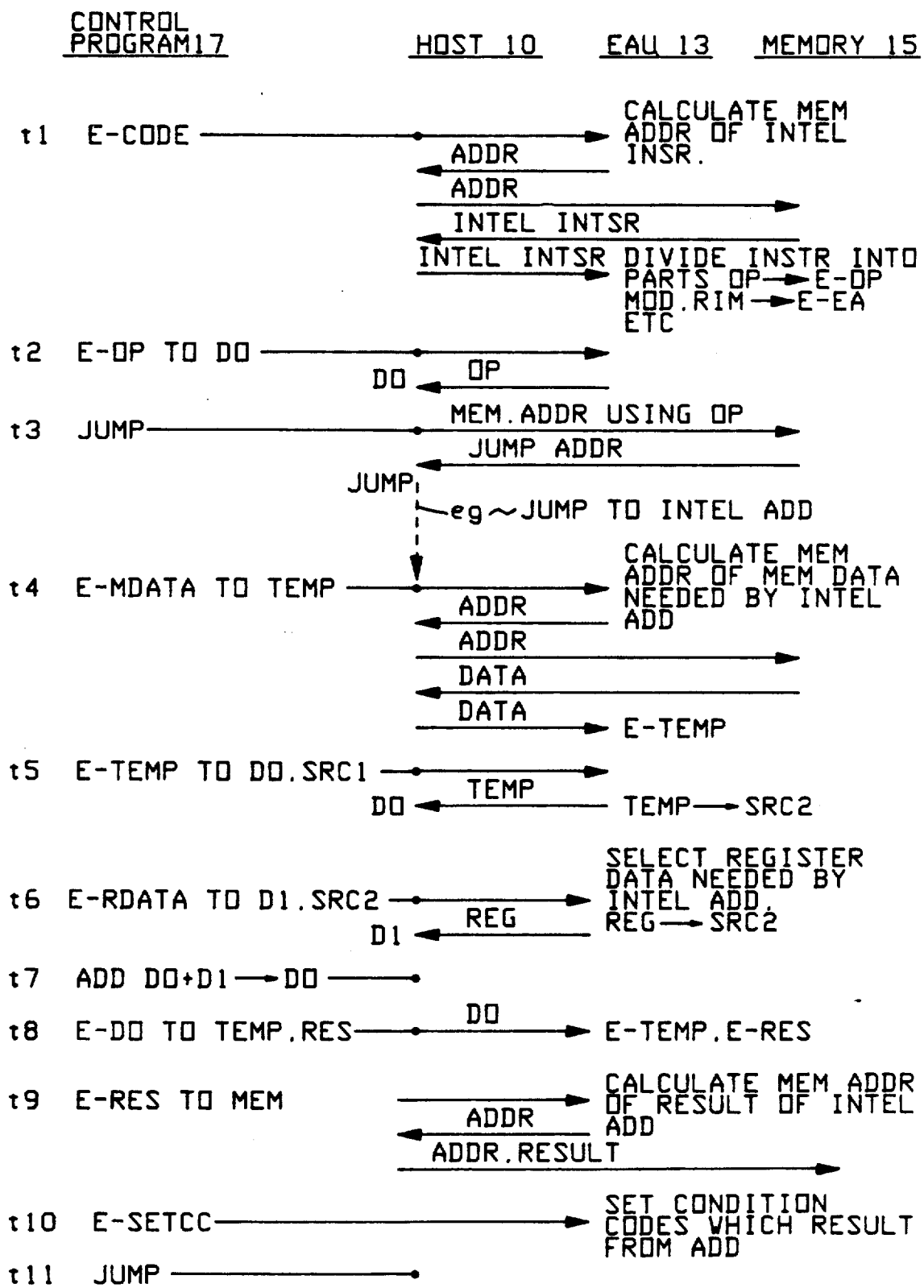
FIG. 4 illustrates the time sequence by which the emulator assist unit, host processor, and memory of the FIG. 1 emulator interact to perform user instructions.

Considering now FIG. 4, it shows the time sequence by which the emulator assist unit 13 interacts with the host processor 10 and the control program 17 during the emulation process. Initially, as is indicated at time $t_1$, the host processor 10 reads an instruction from the control program 17. Any instruction which is prefixed with an E indicates that it is for the emulator assist unit; and so at time $t_1$ the host processor 10 passes the E.-DECODE instruction to the emulator assist. Upon receipt of the E-DECODE instruction, the emulator assist unit 13 calculates the memory address of the next Intel 80286 instruction that is to be executed in the user program 16, and it sends that address to the host processor. In performing this memory address calculation, the decode logic 13h passes the content of the IP and CS registers thru the emulator assist unit adders along with the content of the E-MBASE register.

Next, the host processor 10 uses the above address to retrieve an Intel instruction 16a from memory 15. That Intel instruction is then sent by the host processor 10 to the emulator assist unit 13. Upon receiving the Intel instruction, the emulator assist unit 13 partitions it as follows: the OP code portion of the instruction goes to the E-OP register; the MOD and R/M and SIB fields go to the E-EA register; the displacement portion of the instruction, if any, goes to the E-DISP register; the immediate data portion of the instruction, if any, goes to the E-DATA register; and the prefix portion of the instruction, if any, goes to E-PRE.

Next, at time $t_2$, the host processor 10 reads another instruction from the control program 17. This instruction also is prefixed with an E; and so it is passed to the emulator assist unit. There, the instruction is decoded by the decode logic 13h as requesting a transfer of the E-OP register back to the host; and so the INST control signals are generated such that register E-OP is transferred to the bus interface logic 13j which in turn transfers register E-OP back to the host.

Next, at time $t_3$, the host processor reads another control program instruction which is a JUMP. This JUMP is executed in the host of processor 10; and it causes the host processor to form a memory address using the content of its register D0 (which now contains the Intel OP code); read the content of memory 15 at that address; and jump by changing its program counter to the location as read from memory. By this means, each different Intel OP code causes a branch to a corresponding different location in the control program 17.

As one specific example, FIG. 4 shows the branch which is taken when the OP code is for an Intel ADD instruction. In that case, the next control program instruction, which is executed at time $t_4$, is for the emulator assist unit 13. In response to this instruction, unit 13 calculates the memory address of one operand that is needed by the Intel ADD instruction. To calculate this memory address, the effective address control logic 13g generates the control signals SEGCNTL, ICNTL, DCNTL, and RCNTL such that the contents of the appropriate registers are passed through the adders 13a-13e. The resulting address from adder 13e is sent to the host 10 which in turn retrieves the operand from memory 15 and returns it to the emulator assist unit. There, the operand is byte-swapped and sign-extended, and the result is stored in register E-TEMP.

Next, at time $t_5$, another control program instruction is read by the host processor 10. This instruction is also passed to the emulator assist unit which performs it by passing the content of register E-TEMP to the host processor and by also placing the content of E-TEMP into register E-SRC1.

Next, at time $t_6$, another control program instruction is read from the host 10 which in turn is passed to the emulator assist unit 13. In response, the decode logic 13h selects the content of one of the registers AX, BX, CX and DX as is specified by the Intel instruction, and it sends that register back to the host. Also, the content of that selected register is placed in register E-SRC2.

Next, at time $t_7$, the host processor 10 reads another control program instruction which this time is for its own execution. By this instruction, the host processor adds the contents of its registers D0 and D1, and it places the result in D0. By that operation, it performs the addition which is specified by the current Intel instruction that is being emulated.

Next, at time $t_8$, the host processor reads another control program instruction. In response, the host processor 10 transfers the content of its register D0 to the emulator assist unit; which, in turn, places that data in the registers E-TEMP and E-RES.

Next, at time $t_9$, the host processor 10 reads another control program instruction which it then passes to the emulator assist unit for execution. In response, the effective address control logic 13g in the emulator assist unit generates the control signals SEGCNTL, ICNTL, DCNTL, and RCNTL such that a memory address is formed at the output of adder 13e. This address is where the resul of the Intel ADD instruction is to be stored, and it, as well as the byte-swapped result of the add, are passed by the emulator assist unit to the host processor 10. In turn, the host stores the byte-swapped result of the add in memory at the addressed location.

Next, at time $t_{10}$, the host processor reads another control program instruction which it then passes to the emulator assist unit 13. In response, the condition code logic 13*i* uses the content of registers E-RES, E-SRC1, and E-SRC2 to set the indicators in the E-FLAG register such that they reflect the result of the Intel ADD instruction.

Lastly, the host processor 10 reads another control program instruction; and this instruction causes the host processor to jump back to the beginning of the control program which was executed at time $t_1$. Thereafter, the above-described sequences of times $t_1$, $t_2$, and $t_3$ are repeated to retrieve and set up the next Intel instruction that is to be emulated; and the jump at time $t_3$ will be to the portion of the control program 17 which splits up the tasks between the host and the emulator assist unit for emulating that next Intel instruction.

By dividing the tasks of emulating an Intel 80×86 instruction as described above, the complexity of the emulator assist unit is substantially reduced over that which would be required if unit 13 performed all of the emulation tasks. For example, unit 13 does not have to duplicate the arithmetic-logic circuits which are in the host processor 10 and which perform the operations that are specified by the Intel 80×86 OP codes. Also, unit 13 does not have to duplicate any of the control circuitry and registers of the host processor 10 that is required to interface with the memory 15.

Also, by dividing the emulation tasks as described above, a substantial increase in execution speed is attained over that which is achieved by performing emulation entirely with host software. For example, when the Intel 80×86 ADD instruction is performed as described in FIG. 4, a total of just eleven host-emulator assist unit instructions are required; whereas when that same Intel 80×86 ADD instruction is emulated solely by Motorola 68030 host software, over two hundred 68030 instructions are required.

Further, for comparison purposes, suppose that the Intel 80×86 ADD instruction tasks are partitioned between the host processor 10 and the emulator assist unit 13 as described in FIG. 4, but that unit 13 is modified to operate not as a co-processor but as an I/O device which interacts with the host processor 10 through interrupts. Under those conditions, each time the emulator assist unit 13 transfers information to the host processor 10, the host processor would have to execute an interrupt program which identifies all interrupting devices and then services the interrupts in a sequential fashion. Each such interrupt service would take about five Motorola 68030 instructions, and there are nine such data transfers in the FIG. 4 ADD.

Considering now FIGS. 5A thru 5D, they show additional details of how the effective address control logic 13*g* operates. In particular, FIG. 5A shows the various bit combinations in the R/M field of an Intel 80286 instruction and the corresponding registers which they select; FIG. 5B shows the various bit combinations of the MOD field of an Intel 80286 instruction and how they affect the registers in FIG. 5A; FIG. 5C shows the various bit combinations of the REG field of an Intel 80286 instruction and how they select the Intel registers; and FIG. 5D shows how the Intel 80286 segment registers are implicitly selected. All of these register selections are made by the effective address control logic 13*g*. It uses combinational logic circuits to decode the R/M field, MOD field, and REG field in registers E-PRE, E-OP, and E-EA, and in response generates the proper SEGCNTL, ICNTL, DCNTL, and RCNTL control signals such that the correct registers are passed through the addres 13*a*–13*e*. These logic circuits can, for example, be programmable logic arrays. Similarly, control circuits 13*i* and 13*h* can also consist of programmable logic arrays.

A preferred embodiment of the invention has now been described in detail. In addition, however, many changes and modifications can be made to these details without departing from the nature and spirit of the invention. For example, the computer that is being emulated is not limited to the Intel 80×86; many other computers can also be emulated by the FIG. 1 system. For each new instruction set that is to be emulated, the details of the registers and controls in the FIG. 3 emulator assist unit will change to match the new instruction set; but the manner in which tasks are divided remains the same.

Figure 6:
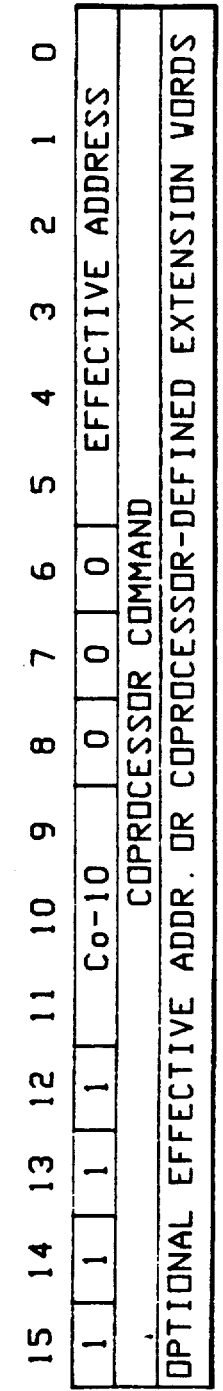
FIG. 6 illustrates additional details on how instructions for the emulator assist unit can be implemented.

Also, the host processor 10 need not be a 68030; it can be any processor that has a co-processor interface over which data is transferable to/from the emulator assist unit without interrupt processing. In the Motorola 68030, such data transfers are initiated by instructions that have the format shown in FIG. 6. Bits 15 thru 12 of the first sixteen-bit word being a 1111 indicates that the instruction is for the emulator assist unit rather than the host, and all of the bits of the second sixteen-bit word specify the actual tasks which the emulator assist unit is to do. These tasks are specified by the emulator designer, and an optional third sixteen-bit word can be used to specify additional information that is used in that task. All of this is just one example of how the "E" prefixed instructions of FIG. 4 can be implemented.

Accordingly, it is to be understood that the invention is not limited to the above details but is defined by the appended claims.

What is claimed is:

1. An emulation assist unit for use in performing emulation in conjunction with a host processor and a memory which are coupled together over a bus; said host processor performing the operation specified in a user instruction by utilizing operand memory addresses determined by the emulation assist unit, comprising:

a means for receiving said user instruction from said host processor over said bus and for storing the received user instruction;

a plurality of registes which are selectively called for by various fields in said user instruction;

an emulation assist unit command decoder for receiving a sequence of emulation assist unit commands from said host processor over said bus for each of said user instructions and for decoding said sequence of commands; and, logic means which responds to certain decoded emulation assist unit commands by combining the content of the registers which said fields of said user instruction select to generate said memory address of an operand specified by said user instruction.

2. An emulation assist unit according to claim 1 wherein said logic means includes multiple addres which generate said memory address by combining the content of more then two of said registers simultaneously.

3. An emulation assist unit according to claim 2 wherein said logic means includes five adders and a shifter.

4. An emulation assist unit according to claim 3 wherein said logic means further includes means for forming an address of said user instruction in said memory.

5. An emulation assist unit according to claim 4 wherein said memory includes a control program which consists of a mixture of said emulation assist unit commands of a mixture of said emulation assist unit commands for said emulation assist unit and host instructions for said host processor.

6. An emulation assist unit according to claim 5 wherein said user instructions and said host instructions have substantially different formats.

7. An emulation assist unit according to claim 6 wherein said user instructions and said host instructions specify substantially different registers for generating operand addresses.

8. An emulation assist unit according to claim 1 wherein said memory includes a control program which consists of a mixture of said emulation assist unit commands for said emulation assist unit and host instructions for said host processor.

9. An emulation assist unit according to claim 8 wherein said user instructions and said host instructions have substantially different formats.

10. An emulation assist unit according to claim 9 wherein said user instructions and said host instructions specify substantially different registers for generating operand addresses.

* * * * *